(12) United States Patent
Akahane

(10) Patent No.: US 8,851,377 B2
(45) Date of Patent: Oct. 7, 2014

(54) CARD READER AND PROCESSING METHOD THEREOF

(75) Inventor: Fumihiko Akahane, Nagano (JP)

(73) Assignee: Nidec Sankyo Corporation (JP)

( * ) Notice: Subject to any disclaimer, the term of this patent is extended or adjusted under 35 U.S.C. 154(b) by 483 days.

(21) Appl. No.: 12/666,194

(22) PCT Filed: Mar. 31, 2009

(86) PCT No.: PCT/JP2009/001478
§ 371 (c)(1),
(2), (4) Date: Dec. 27, 2010

(87) PCT Pub. No.: WO2009/122715
PCT Pub. Date: Oct. 8, 2009

(65) Prior Publication Data
US 2011/0084138 A1    Apr. 14, 2011

(30) Foreign Application Priority Data

Mar. 31, 2008 (JP) ................. 2008-092916

(51) Int. Cl.
| | |
|---|---|
| *G06K 7/10* | (2006.01) |
| *G06K 13/08* | (2006.01) |
| *G06K 7/08* | (2006.01) |
| *G11B 25/04* | (2006.01) |
| *G11B 17/04* | (2006.01) |
| *G11B 5/008* | (2006.01) |

(52) U.S. Cl.
CPC ........ *G11B 5/00808* (2013.01); *G06K 13/0843* (2013.01); *G06K 7/087* (2013.01); *G11B 25/04* (2013.01); *G06K 7/10* (2013.01); *G06K 7/084* (2013.01); *G11B 17/0408* (2013.01)

USPC ........... 235/454; 235/379; 235/380; 235/492; 235/493

(58) Field of Classification Search
USPC .................................. 235/449, 491
See application file for complete search history.

(56) References Cited

U.S. PATENT DOCUMENTS

| | | | | |
|---|---|---|---|---|
| 4,041,279 | A * | 8/1977 | Foote ............................. | 235/440 |
| 5,362,951 | A * | 11/1994 | Kanazawa et al. ............ | 235/449 |
| 5,828,043 | A * | 10/1998 | Nicoll et al. ................... | 235/380 |
| 6,076,731 | A * | 6/2000 | Terrell ........................... | 235/454 |
| 6,164,538 | A * | 12/2000 | Furuya et al. ................. | 235/449 |
| 2003/0047615 | A1 * | 3/2003 | Batoha .......................... | 235/491 |
| 2003/0178487 | A1 * | 9/2003 | Rogers .......................... | 235/454 |
| 2006/0102714 | A1 * | 5/2006 | Wisniewski et al. .......... | 235/379 |

FOREIGN PATENT DOCUMENTS

| | | |
|---|---|---|
| JP | 4-330580 A | 11/1992 |
| JP | 2004-145 A | 1/2004 |
| JP | 2005-78133 A | 3/2005 |

OTHER PUBLICATIONS

International Search Report for International Application No. PCT/JP2009/001478 mailed Jul. 7, 2009 with English Translation.

* cited by examiner

*Primary Examiner* — Christopher Stanford
(74) *Attorney, Agent, or Firm* — Cantor Colburn LLP

(57) ABSTRACT

A card reader for use with a card having a magnetic stripe may include a card path through which the card having the magnetic stripe is transferred, a magnetic head placed in the card path, and card position detecting sensors for detecting a position of the card. The card position detecting sensors may be located at positions where the magnetic stripe passes through in the card path.

3 Claims, 6 Drawing Sheets

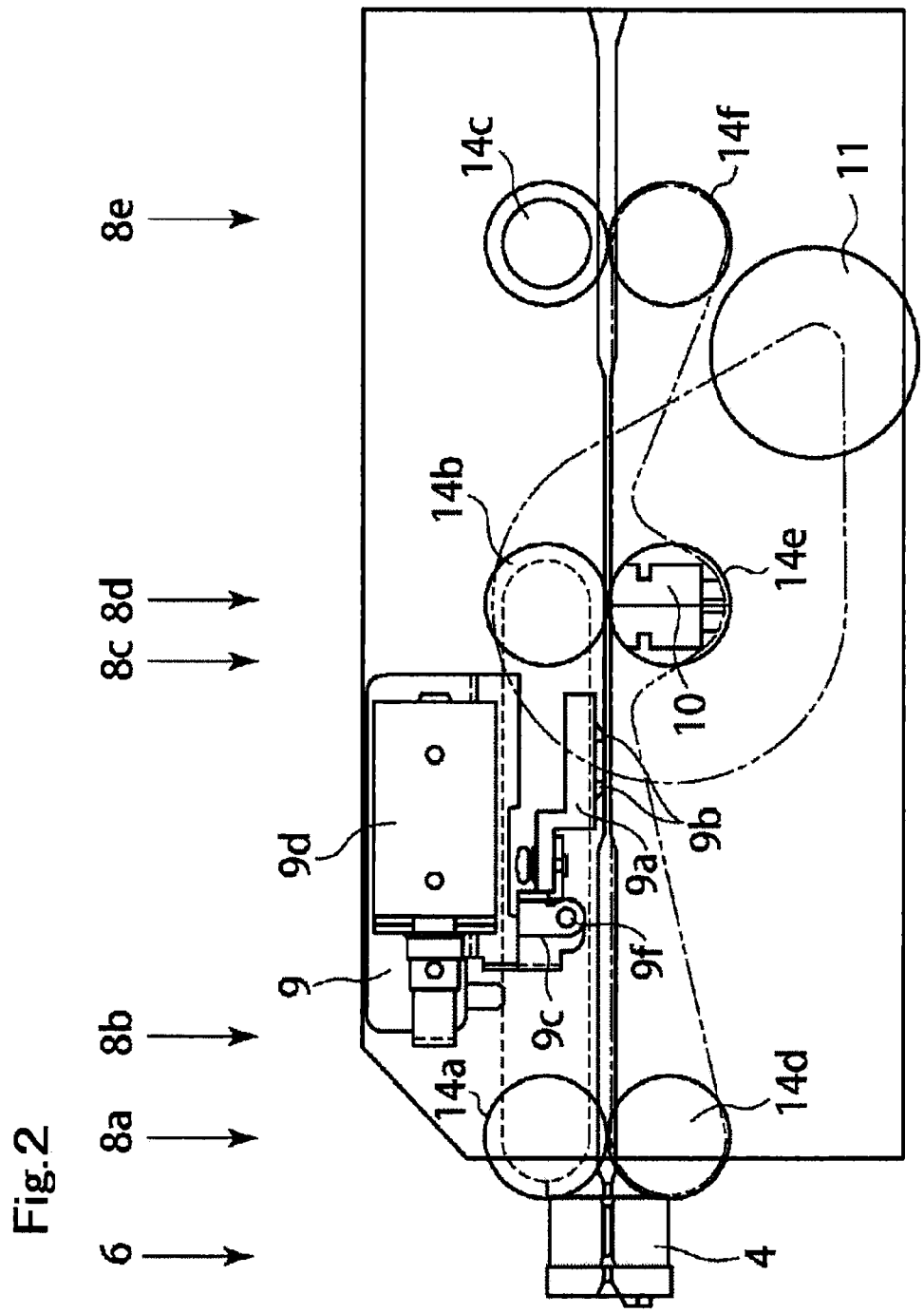

NORMAL CARD

TRANSPARENT CARD

CARD READER AND PROCESSING METHOD THEREOF

CROSS REFERENCE TO RELATED APPLICATIONS

This is a U.S. national stage of application No. PCT/JP2009/001478, filed on Mar. 31, 2009. Priority under 35 U.S.C. §119(a) and 35 U.S.C. §365(b) is claimed from Japanese Application No. 2008-092916, filed Mar. 31, 2008, the disclosure of which is also incorporated herein by reference.

FIELD OF THE INVENTION

The present invention relates to a card reader including a magnetic head and a processing method of the card reader, and particularly to detection of a card position in a card path.

BACKGROUND

As cards to be used in financial institutions and other facilities for the purpose of realization of cashless service and personal authentication, conventionally there is a magnetic card in which a magnetic stripe is formed on a plastic substrate surface, as well as an IC card in which an integrated-circuit chip is embedded in a plastic substrate. Then, recording and reproducing magnetic data to/from the magnetic card, and sending and receiving electronic data to/from the IC card is carried out by using a card reader.

The card reader reads magnetic data saved in the magnetic card and writes new magnetic data into the magnetic card through making the magnetic head come into contact with, and slide on the magnetic stripe on the magnetic card surface. Also, the card reader reads electronic data saved in the IC card and writes new electronic data into the IC card through making its IC contact come into contact with the metal terminal (IC terminal) on the IC card surface.

In recent years, there appeared banking cards and credit cards for which their card design had been researched. As an example of those cards, there is a plastic card including a transparent part. Conventionally, there has been a card in which only a specified area according to the standard specifications is transparent (Hereinafter, such a card is called "a standardized transparent card"). In these years, however, occasionally there are also seen some cards in which an area not defined specifically according to the standard specifications is transparent (Hereinafter, such a card is called "a non-standardized transparent card"). Then, in the case of such a non-standardized transparent card, a conventional card reader cannot carry out recording and reproducing data saved in the card so that observed are an increasing number of cases in which the card reader becomes unable to operate and cannot handle the card normally.

In the case of a conventional card reader, an optical sensor is used for detecting a card position in a card path, in order that the sensitivity of the sensor is not influenced by any of the surrounding magnetic environment, environmental temperature, and humidity. Therefore, when such a non-standardized transparent card described above is inserted and transferred in the card reader, a light beam passes through the transparent area so that it is difficult for the card position detecting sensor of an optical type to detect a card position. Due to the reason, a CPU may have a chance of missing the card position (As a result, the card reader may become unable to operate normally). To prevent such a situation from coming up; in the case of any card about which it is doubtful whether or not the card can be handled normally (such as a non-standardized transparent card), it is judged before taking the card into the card reader that the card is an abnormal one to/from which data cannot be recorded and reproduced. Then, a measure is taken to minimize the operation interruption time through an ejecting operation (such as ejecting the card promptly to external) before becoming unable to operate normally.

On the other hand, a technology for recognizing a transparent card appropriately by devising a new means on the card has also appeared (Refer to Patent Document 1). In the case of a transparent card disclosed in Patent Document 1, special ink is applied between a front-side coat and a rear-side coat of the card to overcome a problem that a financial automated teller machine (ATM) cannot read data of the transparent card.

Patent Document 1: Japanese Utility Model Application Publication No. 2004-145

However, when a non-standardized transparent card that a card reader cannot handle is inserted into the card reader and any operation (such as recording and reproducing magnetic/electronic data and/or sending and receiving electronic data) is not carried out at all, it becomes a problem that the card reader cannot flexibly deal with diversification of customer needs.

More specifically to describe; as the card market expands, customer needs increase in such a way that card operations should be carried out as much as possible (For example, only a magnetic data reading operation is enabled, while an electronic data reading operation cannot be carried out) even when a non-standardized transparent card as described above is inserted. If a card reader nevertheless cannot accept non-standardized transparent cards at all unconditionally, the card reader is considered to be unable to flexibly deal with diversification of customer needs.

Meanwhile, devising a new means at the card side is conceivable as disclosed in Patent Document 1 mentioned above. However, from the viewpoint of costs, it is unpractical to apply special ink onto all transparent cards already distributed in the market. In the end, it is preferable that the problem is dealt with at the card reader side.

Thus, it is desirable to provide a card reader that can meet the customer needs to a certain extent even when a non-standardized transparent card is inserted, while considering a background of card design that spreads in a wide variety these years.

SUMMARY OF THE INVENTION

To achieve the above, at least an embodiment of the present invention provides the following aspects.

(1) A card reader may include a card path through which a card having a magnetic stripe is transferred; a magnetic head placed in the card path; and card position detecting sensors for detecting a position of the card; wherein the card position detecting sensors are located at positions where the magnetic stripe passes through in the card path.

According to at least an embodiment of the present invention, the card reader includes a card path, a magnetic head, and card position detecting sensors; and the card position detecting sensors are located at positions where the magnetic stripe of the card passes through in the card path. As a result, the magnetic head and the card position detecting sensors are placed along the magnetic stripe almost in the same straight line.

Therefore, even when a non-standardized transparent card is inserted into the card reader, movement of the magnetic stripe is traced by using the magnetic head and the card position detecting sensors so as to detect the position of the transparent card according to the tracing result, while the magnetic stripe being formed in black or brown of magnetic powder that a magnetic recording layer has by its nature. Therefore, an operation can continue as far as possible.

Namely in a conventional art, when a non-standardized transparent card is inserted into the card reader but some card position detecting sensors cannot detect the card position, the card reader determines that a non-standardized transparent card has been inserted or the card has been taken out, so as to eventually carry out an ejecting operation for removing the card forcibly. However, according to at least an embodiment of the present invention, not only the card position detecting sensors but also the magnetic head are used for detecting the card position. Therefore, by adjusting location intervals of the card position detecting sensors and the magnetic head (which are placed almost in a straight line), it becomes possible to detect the card position even when a non-standardized transparent card is inserted into the card reader. Thus, a certain operation becomes enabled; for example, only reading magnetic data can be done; to continue operation as far as possible. As a result, the card reader according to at least an embodiment of the present invention makes it possible to flexibly deal with diversification of customer needs.

In the present invention, the type and the number of the 'card position detecting sensors' do not matter.

For example, the sensors may be any of optical sensors, magnetic sensors, and ultrasonic sensors. Furthermore, the number of the sensors may be one, or two or more. Meanwhile, though it is necessary for the card position detecting sensors to include at least one sensor located at a position where the magnetic stripe passes through in the card path, this requirement does not reject existence of other sensors that are not placed at positions where the magnetic stripe passes through.

(2) The card reader: wherein at least one of the card position detecting sensors is placed at a side of a card insertion slot for inserting the card, with reference to the position of the magnetic head; while at least another one of the card position detecting sensors is also placed at a side of a downstream in a card transfer direction, with reference to the position of the magnetic head.

According to at least an embodiment of the present invention, in the card reader, at least one of the card position detecting sensors described above is placed at a side of a card insertion slot for inserting the card, with reference to the position of the magnetic head; while at least another one of the card position detecting sensors is also placed at a side of a downstream in a card transfer direction, with reference to the position of the magnetic head. Therefore, even in the case of a card reader in which the magnetic head is located around a middle part of the card path, the card position can be detected appropriately by using the magnetic head, the card position detecting sensor placed before the magnetic head in the view from the card insertion slot, and the card position detecting sensor placed after the magnetic head.

(3) A processing method of the card reader including: reproducing/recording data from/to the magnetic stripe on the card inserted through the card insertion slot; transferring the inserted card through the card path by a transfer means driven by a drive source; and detecting the position of the card according to detection signals from the plurality of card position detecting sensors located in the card path, for controlling the transfer operation; wherein the card position detecting sensors include a sensor that is placed in a line through which the magnetic stripe passes, and a sensor that is placed in the proximity of the magnetic head; and while, by using a detection signal from one of the magnetic head and the sensor placed in the proximity of the magnetic head, it is judged that the inserted card is a normal card, and the operation continues.

According to at least an embodiment of the present invention, in the processing method of the card reader described above, the card position detecting sensors include a sensor that is placed in a line through which the magnetic stripe passes, and a sensor that is placed in the proximity of the magnetic head; and while, by using a detection signal from one of the magnetic head and the sensor placed in the proximity of the magnetic head, it is judged that the inserted card is a normal card that can carry out recording/reproducing data appropriately, and the operation continues for carrying out recording/reproducing magnetic/electronic data and the like. Therefore, even in the case of a non-standardized transparent card, an operation can continue as far as possible. As a result, the card reader according to at least an embodiment of the present invention makes it possible to flexibly deal with diversification of customer needs.

In at least an embodiment of the card reader according to the present invention, the relationship of the positions of the magnetic head and the card position detecting sensors is so schemed that the card reader can meet the customer needs to a certain extent even when a non-standardized transparent card is inserted.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is a longitudinal sectional view showing the structure of the card reader according to the embodiment of the present invention.

FIGS. 3(A)-3(C) are timing charts that show timing of a detection signal of each sensor turning on.

DETAILED DESCRIPTION OF PREFERRED EMBODIMENTS

Figure 1:
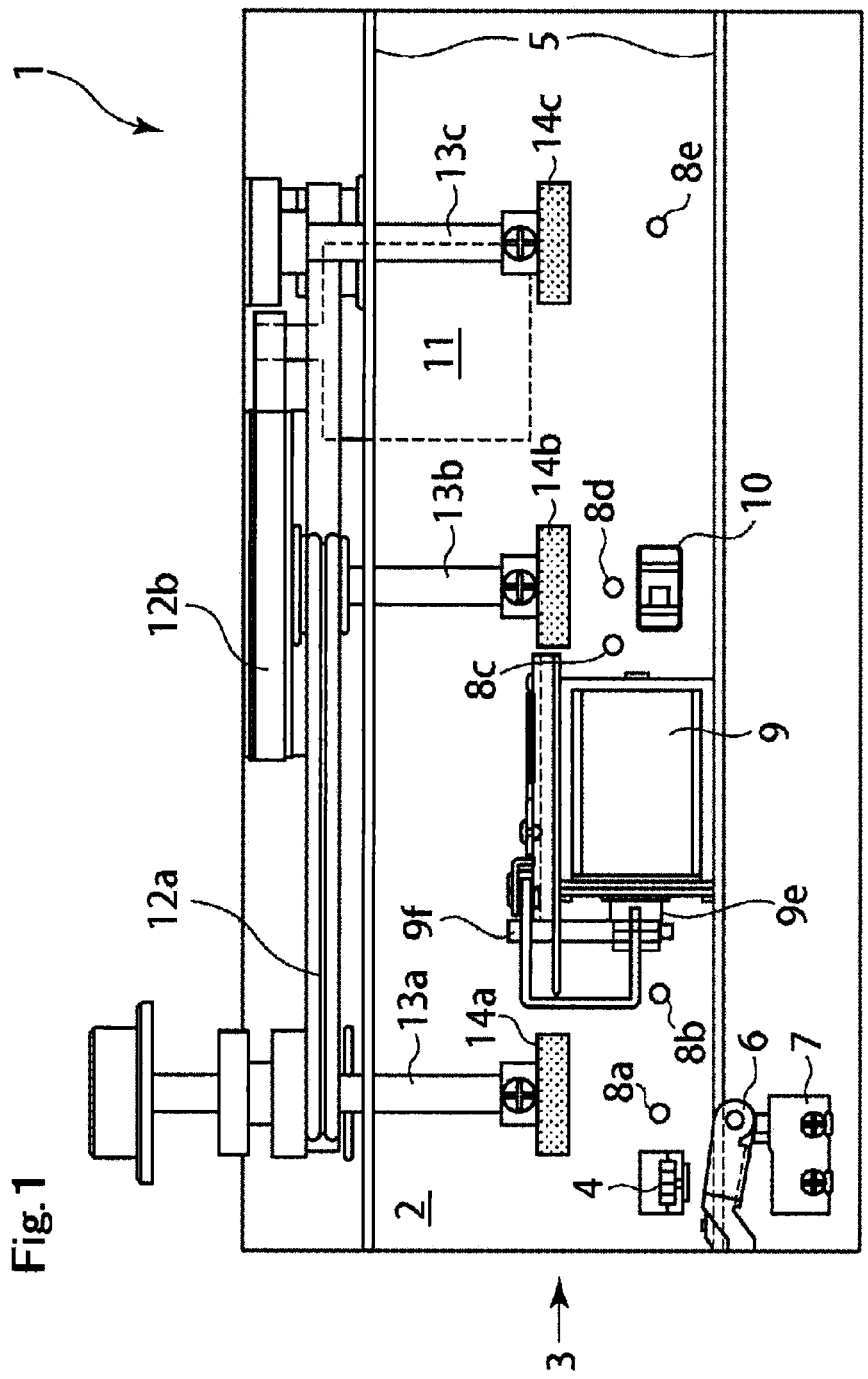
FIG. 1 is a cross-sectional plan view showing a structure of a card reader according to an embodiment of the present invention.

An embodiment of the present invention is described below with reference to the accompanying drawings.
[Structure of Card Reader]
FIG. 1 is a cross-sectional plan view showing a structure of a card reader 1 according to an embodiment of the present invention. FIG. 2 is a longitudinal sectional view showing the structure of the card reader 1 according to the embodiment of the present invention.

Furthermore, each arrow in FIG. 2 shows a position of its corresponding reference numeral indicated in FIG. 1

In FIG. 1, the card reader 1 according to the embodiment of the present invention includes: a card insertion slot 3 for taking a card (one of a magnetic card and an IC card) into a card path 2 and then inserting the card into the card reader 1; a pre-head 4 for transmitting a signal that works as a trigger for driving operation of a drive motor 11 to be described later; a lever 6 protruding through a card path side plate 5 into the card path 2; a micro switch 7 for detecting mechanical motion of the lever 6; photo sensors 8a to 8e for the purpose of such as checking a position of the card in the card path 2 and length of the card, the photo sensors being placed so as to face photodiodes (not shown); an IC contact block mechanism 9 for sending/receiving electronic data to/from the IC card when the IC card being inserted; a magnetic head 10 for recording/reproducing magnetic data to/from the magnetic card when the magnetic card being inserted; the drive motor 11 (shown as a dotted-line area in the figure) for rotating drive rollers 14d to 14f through the transmission belts 12a and 12b and drive shafts 13a to 13c; and various other mechanical components and electric components (not shown).

When the inserted card is taken in through the card insertion slot 3, the pre-head 4 detects the card taken in and transmits a signal, which works as a trigger for driving operation of the drive motor 11, to a CPU (not shown) placed in the card reader 1. Then, as the CPU in the card reader 1 receives the trigger signal and accordingly sends a driving signal to the drive motor 11, the inserted card is drawn in (transferred). Subsequently, the inserted card is transferred toward a back-end of the card path 2 (toward a right end in FIG. 1) by means of the drive rollers 14d to 14f.

The lever 6 and the micro switch 7 constitute an example of "a card position detecting sensor" for detecting a position of the inserted card, and work as a switch for detecting that the card has been inserted. When the card inserted through the card insertion slot 3 is taken in; the lever 6, a part of which protrudes into the card path 2, comes into contact with the inserted card so that the lever 6 is shifted down in a lower direction in FIG. 1. Then, taking the shift of the lever 6 as a cue, the micro switch 7 detects the mechanical motion of the lever 6. At the time, the micro switch 7 transmits a detection signal to the CPU in the card reader 1 to notify that the mechanical motion of the lever 6 has been detected. In accordance with the detection signal, the CPU notices the presence of the inserted card. Furthermore, the lever 6 and the micro switch 7 can also be used to measure the length of the inserted card as well.

Each of the photo sensors 8a to 8e is a optical sensor including a combination of a light emitting element and a light receiving element. When a card passes through between the light emitting element and the light receiving element (namely, through the card path 2), a light beam emitted from the light emitting element is intercepted by a magnetic stripe formed on a surface of the card for detecting a presence of the card. It is conceivable to use any of magnetic sensors and ultrasonic sensors as the photo sensors 8a to 8e. However, sensitivity of magnetic sensors is affected by the surrounding magnetic environment, and sensitivity of ultrasonic sensors is affected by temperature and humidity of the surrounding environment. Therefore, it is preferable to use optical sensors that are not affected under those conditions. Otherwise, infrared ray sensors may as well be used as the sensors. Then, also the photo sensors 8a to 8e can function as an example of "card position detecting sensors" for detecting a position of the inserted card (It is also possible to assume that only the photo sensors 8a to 8e are an example of "card position detecting sensors").

The IC contact block mechanism 9 operates when the inserted card is an IC card. The IC contact block mechanism 9 includes IC contacts 9b placed along the card path 2, which are able to come in contact with a metal terminal (an external terminal) placed on a surface of the IC card. When the IC contacts 9b come in contact with the card, electronic data is read and written. Meanwhile, the magnetic head 10 located in the card path 2 carries out its operation when the inserted card is a magnetic card. Then, the magnetic head 10 reads and write magnetic data while contacting with and sliding on the magnetic stripe formed on the card surface.

More concretely to describe with reference to FIG. 2, the IC contact block mechanism 9 mounted on the card reader 1 according to the embodiment of the present invention has a construction including a contact block 9a that comes in contact with the external terminal placed on the card surface of the inserted card (the IC card) for sending and receiving information. The IC contact block mechanism 9 includes: the IC contacts 9b assembled into the contact block 9a for coming into contact with the external terminal; a rotary arm 9c that makes the IC contacts 9b contact with and detached from the external terminal; and a drive source (actuator) 9d that makes the rotary arm 9c rotate around a shaft 9f.

The drive source 9d linearly reciprocates a plunger 9e connected to the rotary arm 9c for driving the rotary arm 9c. More concretely to describe, the plunger 9e is biased in a protruding direction by a coil spring so as to make the contact block 9a detached from the inserted card when a solenoid assembled in the drive source 9d is not energized. On the other hand, when solenoid assembled in the drive source 9d is energized, the rotary arm 9c rotates around the shaft 9f so as to make the contact block 9a come close to the inserted card.

The IC contacts 9b assembled in the contact block 9a includes 2 lines of wedge-shaped springs that are placed according to the standard specifications of the IC card. Being laid out in a direction perpendicular to the transfer direction of the inserted card, the IC contacts 9b are made of a material that can bend under the condition where the IC contacts 9b come in contact with the inserted card. One end of each IC contact 9b is soldered to a control circuit board placed in the IC contact block mechanism 9 so as to be electrically connected to the control circuit board. Thus, it becomes possible to read (reproduce) electronic data saved in the inserted card (IC card) and to write (record) new electronic data into the inserted card (IC card).

Meanwhile, the magnetic head 10 includes at least one couple of magnetic cores that are placed face to face each other over a magnetic gap (a gap spacer); wherein one magnetic core is wound with a regeneration coil and the other magnetic core is wound with a recording coil, and then the head slides on and moves along the inserted card. Thus, it becomes possible to read (reproduce) magnetic data saved in the inserted card (magnetic card) and to write (record) new magnetic data into the inserted card (magnetic card).

In FIG. 2, the drive rollers 14d to 14f rotated by the drive motor 11 are individually coupled with driven rollers 14a to 14c for holding the inserted card between them. Namely, the driven rollers 14a to 14c are biased against the drive rollers 14d to 14f, respectively. Concretely to describe, the driven rollers 14a to 14c are biased against the drive rollers 14d to 14f, respectively, in a direction from an upper side of the card path 2 so as to contact with a top surface of the inserted card.

In general, magnetic data to be read or written by the magnetic head described above is recorded in a magnetic stripe prepared on a card, to be inserted, by means of printing or the like. Therefore, the magnetic stripe and the magnetic head 10 face each other in the card path 2. In the card reader 1 according to the embodiment, the photo sensors 8a, 8b, and 8e are placed in the same straight line together with the magnetic head 10 in the card transfer direction, as shown in FIG. 1. Therefore, the photo sensors 8a, 8b, and 8e are placed at their positions where the magnetic stripe passed through in the card path 2. Thus, when a non-standardized transparent card is inserted into the card reader 1, the card position can be recognized by means of detecting the magnetic stripe by the photo sensors 8a, 8b, and 8e since a magnetic stripe is formed on the card surface. Details of this operation are described in [Processing Method of Card Reader] to be found later.

Furthermore, as downward arrows indicate in FIG. 2, the photo sensors 8a and 8b of a group including the lever 6 and the photo sensors 8a to 8e listed as "card position detecting sensors" are positioned at a side closer to the card insertion slot 3, into which a card is inserted, with reference to the position of the magnetic head 10. Meanwhile, the photo sensor 8e is positioned at a side further away from the magnetic head 10 toward a downstream in the transfer direction (namely, at the right side in FIG. 2), with reference to the position of the magnetic head 10. Thus, even when a non-standardized transparent card is inserted into the card reader 1, the card position can be detected appropriately. As described above, details of this operation are also explained in [Processing Method of Card Reader].

[Processing Method of Card Reader]

Explained hereinafter is a processing method of the card reader according to the embodiment. An assumption includes the following conditions: namely, the magnetic head 10 reproduces/records data from/to the magnetic stripe on the card inserted through the card insertion slot 3; the inserted card is transferred through the card path 2 by means of the drive rollers 14d to 14f driven by the drive motor 11; and the position of the inserted card is detected according to detection signals from the plurality of photo sensors 8a to 8e, for controlling the transfer operation. The photo sensors 8a to 8e consists of: the photo sensors 8a, 8b, and 8e that are placed in a line through which the magnetic stripe passes; and the photo sensors 8c and 8d that are placed in the proximity of the magnetic head 10. The operation continues; while, by using a detection signal from any one of the magnetic head 10 and the photo sensors 8c and 8d placed in the proximity of the magnetic head 10, it is judged that the inserted card is a normal card.

Concretely to describe; when it is judged that the inserted card is a normal card, the card reader 1 reads magnetic data saved in the card and writes new magnetic data into the card by means of making the magnetic head 10 contact with and slide on the magnetic stripe on the surface of the inserted card. Meanwhile, when the inserted card is an IC card, the card reader 1 reads electronic data saved in the IC card and writes new electronic data into the IC card by means of making the IC contacts 9b come in contact with the metal terminal (external terminal) on the surface of the IC card.

Namely, at the time of taking in the inserted card, it is judged whether the inserted card is a non-standardized transparent card or a normal card, wherein a card having a partially-transparent part is deemed as a non-standardized transparent card. Then, the judgment information is maintained until a next taking-in operation starts, and an algorithm for an internal operation including card transfer operation in the period is independently kept according to the judgment result. Thus, an algorithm as usual is executed in the case of a normal card; while an operation in compliance with a non-standardized transparent card is executed in the case of a non-standardized transparent card, the operation being discussed later (Refer to flowcharts shown in FIGS. 5 and 6 to be described later). Therefore, even when a non-standardized transparent card is inserted, the operation can be carried out without any problem (the operation continues).

Incidentally, when a signal from a magnetic surface of a card is detected for judging a feature of the card at the time of taking in the card, the card is located in the proximity of the head of the magnetic head 10. Therefore, the magnetic head 10 is used as not only a measure of taking in a magnetic signal but also a sensor for judging the presence of the card. Details of the processing method of the card reader is explained below with reference to FIGS. 3 to 6.

Figure 3A:
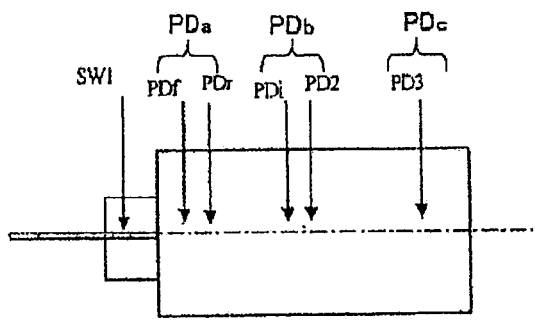
Figure 3B:
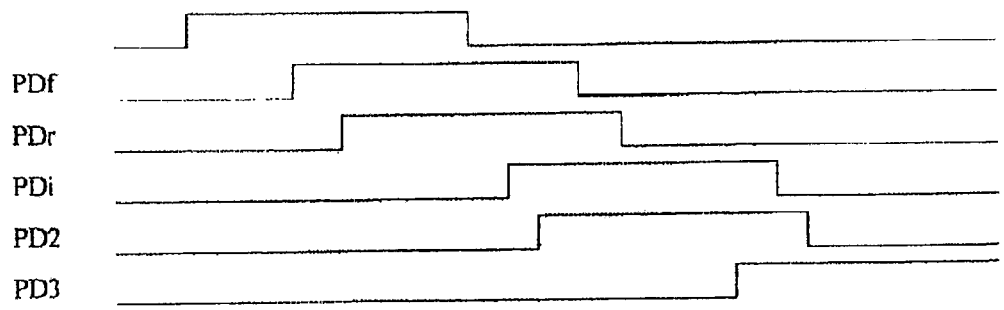
Figure 3C:
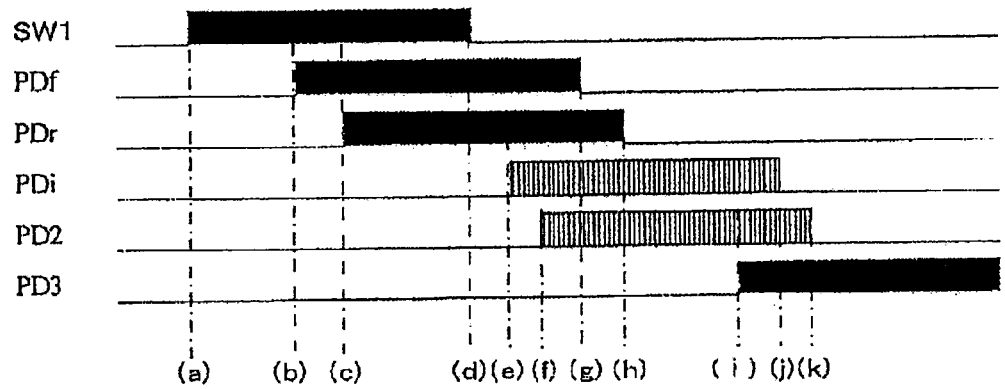

FIGS. 3(A)-3(C) are timing charts that show turn-on timing of a detection signal of each sensor. FIGS. 4(a)-4(k) show transfer motion of a card practically moving through the card path 2. In FIGS. 3(A)-3(C), SW1 is a card position detecting sensor for recognizing that a customer has inserted a card, and the switch corresponds to the lever 6 in FIG. 1. In the meantime; photo sensors, PDf, PDr, Pdi, PD2, and PD3 correspond to the photo sensors 8a, 8b, 8c, 8d, and 8e shown in FIG. 1, respectively, being all optical sensors. Relationships in an layout of these sensors are as FIG. 3(A) shows.

At first, it is assumed that a normal card (such as a card having no transparent part and a standardized transparent card) is inserted, as FIG. 3(B) shows. When SW1 detects that the card is inserted, the rollers start rotating operation in a direction for taking the card into the card reader 1 (in the backward direction: toward the right side in FIGS. 3(A)-3(C)). Then, the presence of the inserted normal card is detected by PDf and PDr. As soon as it is judged that the card has passed PDi and PD2, taking-in (reading) operation of magnetic signals starts. Subsequently, after the inserted normal card arrives at the position of PD3 and then still further moves as specified, the taking-in operation of magnetic signals and transfer operation come to an end. Thus, the inserted card passing PDi and PD2 can be detected.

PDi and PD2 are placed in the proximity of the magnetic head 10, and are not placed over the magnetic stripe of the inserted card. Therefore, in the case of a non-standardized transparent card, a light beam passes through a transparent part at PDi and PD2 so that the inserted card passing cannot be detected sometimes. In such a case, a conventional card reader judges that a non-standardized transparent card has been inserted or a card has been taken out, so that an error handling operation such as a forcible ejecting operation is executed.

In the processing method of the card reader 1 according to the embodiment; in a case where a card must have been transferred up to PDi and PD2 but the card cannot be detected there, or when a card has been once detected at PDi and PD2 but it is judged that the card has disappeared at PDi and PD2, the card is judged to be "a non-standardized transparent card." Then, if once the card is detected to be "a non-standardized transparent card" at the time of taking in the card, operation is controlled afterward on the assumption that PDi and PD2 do not work properly. Then, only reading magnetic data recorded in the magnetic stripe on the card is carried out, and subsequently the non-standardized transparent card is ejected out of the card reader 1 through driving operation of the drive rollers 14d to 14f. Incidentally, in the case of a non-standardized transparent card, it is impossible to carry out any operation that requires PDi and PD2 in terms of functions (e.g., an operation that requires recognizing a card position accurately). More specifically, operations that cannot be carried out include: writing new magnetic data into a non-standardized transparent card; and reading electronic data saved in an IC card, and writing new electronic data into the IC card when the IC card is inserted.

In a case where the inserted card is not "a non-standardized transparent card", the card reader 1 carries out operation as usual. Then, explanation on such a case herewith is omitted. Magnetic signals being sent cyclically from the magnetic head 10 means that a card exists in the proximity of the magnetic head 10; and it is possible to judge that the card is "a standardized transparent card" when no card is detected at PDi and PD2 even though the magnetic head 10 keeps on sending signals. Furthermore, though in a conventional card reader the card length of the inserted card is calculated by using the SW1, PDi, and PD2 as well as a card transfer distance, it is also possible to calculate the card length, for example, by using a piece of information according to magnetic signals from SW1 and the magnetic head 10, that the card arrives at the head of the magnetic head 10, and the card transfer distance.

FIG. 3(C) and FIGS. 4(a)-4(k) illustrate the condition of detection signals from the sensors in a case where "a non-standardized transparent card" is inserted. Symbols (a) to (k) in both the figures are corresponding to each other. Each timing is explained in chronological order as described below: that is to say; at the time of (a), SW1 corresponding to the lever 6 turns on; at the time of (b), PDf corresponding to the photo sensor 8a turns on; at the time of (c), PDr corresponding to the photo sensor 8b turns on; at the time of (d), SW1 turns off; at the time of (e), PDi corresponding to the photo sensor 8c turns on; at the time of (f), PD2 corresponding to the photo sensor 8d turns on; at the time of (g), PDf turns off; at the time of (h), PDr turns off; at the time of (i), PD3 corresponding to the photo sensor 8e turns on; at the time of (j), PDi turns off; and at the time of (k), PD2 turns off.

In FIG. 3(C), time intervals expressed with vertical stripes correspond to periods for which no response is made for "a non-standardized transparent card." Concretely to describe; in a case where a transparent part exists at a position that the standard specifications do not allow to have a transparent part, sometimes detection signals may not be obtained from PDi and PD2. Therefore, in the present embodiment; used for detecting the card position is a magnetic signal obtained from the magnetic head 10, which is placed in a straight line together with PDf, PDr, and PD3, wherein the magnetic signal turns on and off almost at the same time as the detection signals from PDi and PD2. Thus, even in the case described above, operation of recording/reproducing magnetic/electronic data can continue as far as possible.

Figure 5:
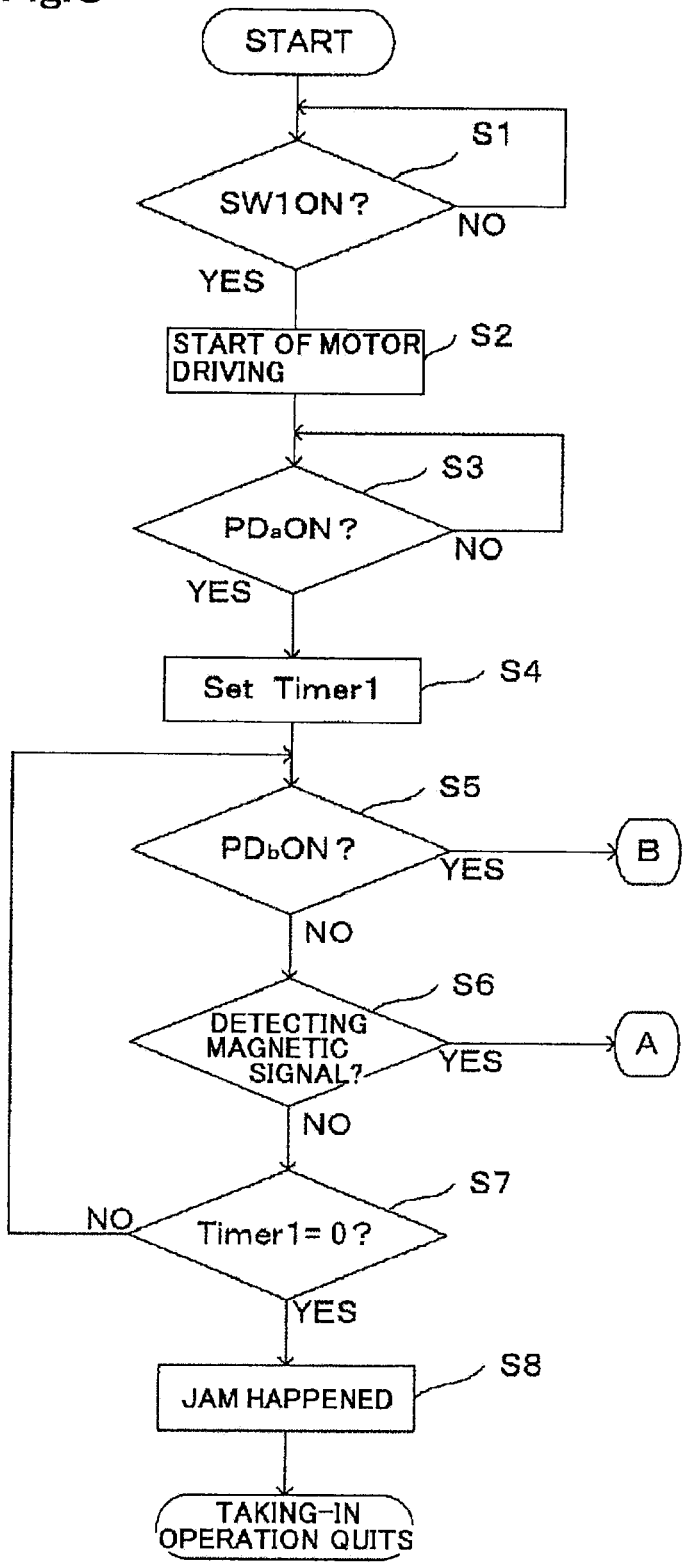
FIG. 5 is a flowchart showing a workflow of a processing method of the card reader according to the embodiment.
Figure 6:
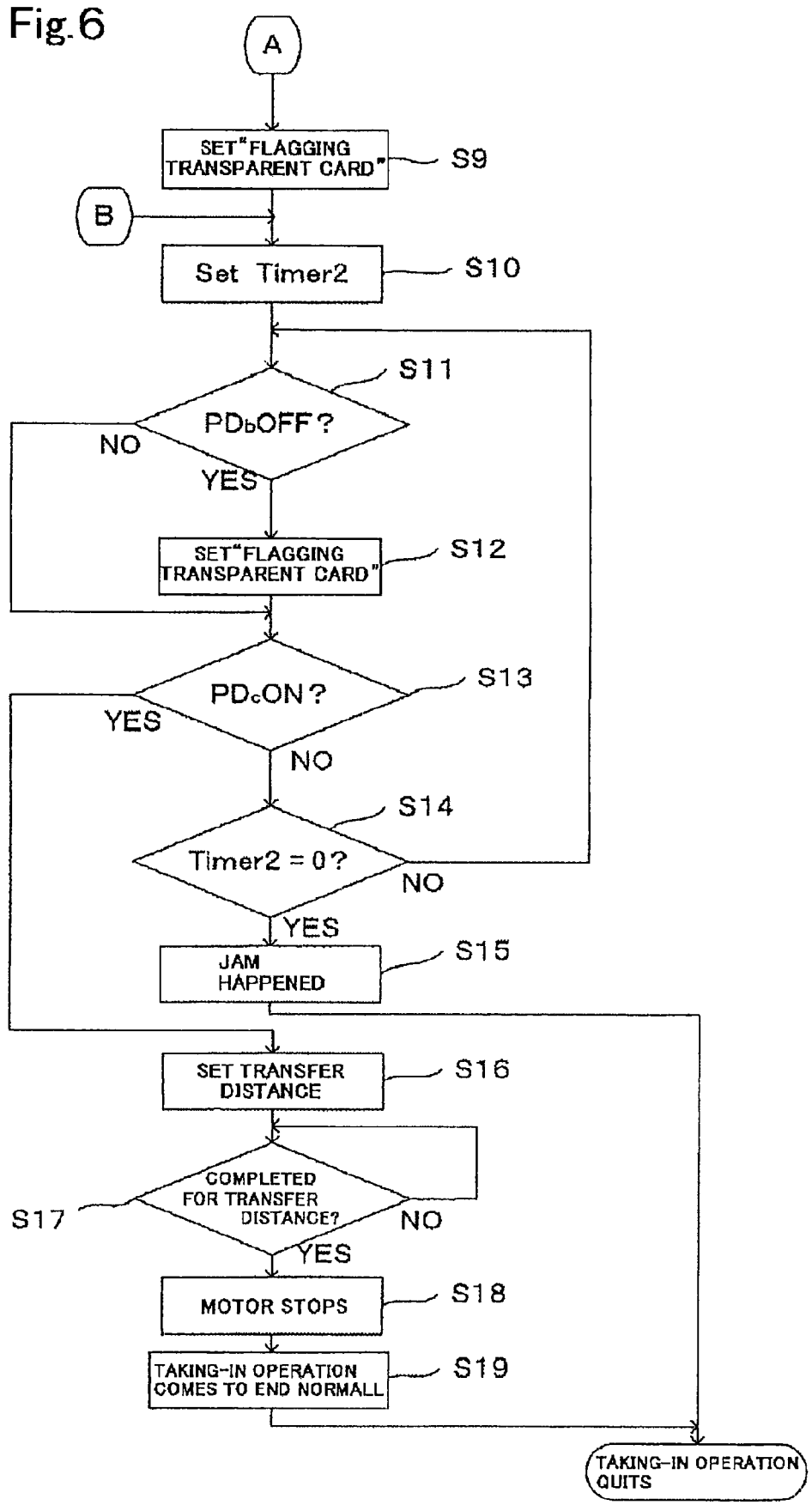
FIG. 6 is a flowchart showing a workflow of the processing method of the card reader according to the embodiment.

Each of FIGS. 5 and 6 is a flowchart showing a workflow of the processing method of the card reader 1 according to the embodiment. In FIGS. 5 and 6; "PDa", "PDb", and "PDc" are equivalent to PDf, PDi, and PD3, respectively ("PDa" may be considered to be equivalent to PDr according to circumstances).

Figure 4A:
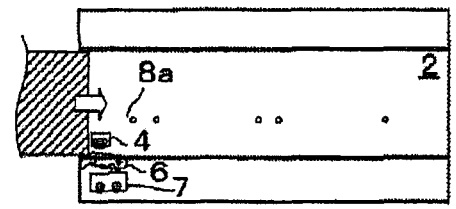
FIGS. 4(a)-4(k) show transfer motion of a card practically moving through a card path.
Figure 4G:
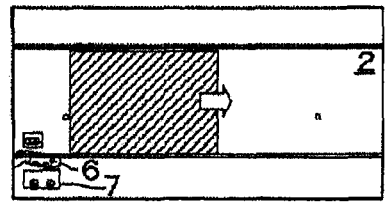
Figure 4B:
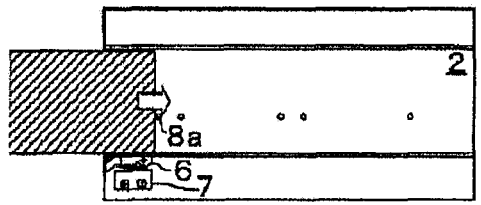
Figure 4H:
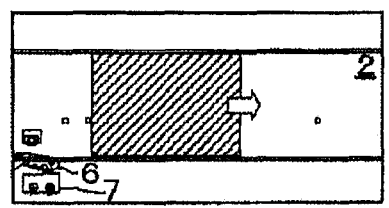
Figure 4C:
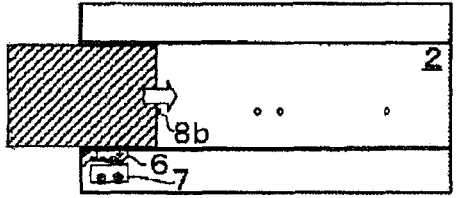
Figure 4I:
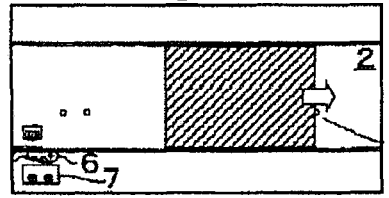
Figure 4D:
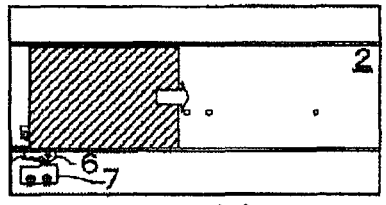
Figure 4J:
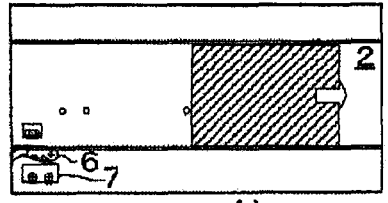
Figure 4E:
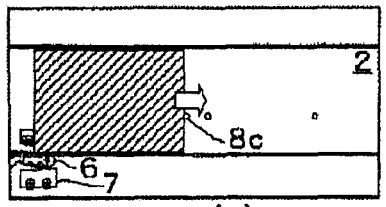
Figure 4K:
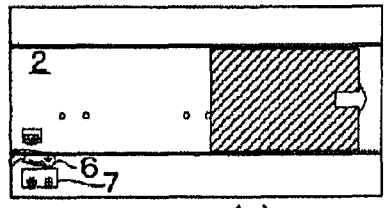
Figure 4F:
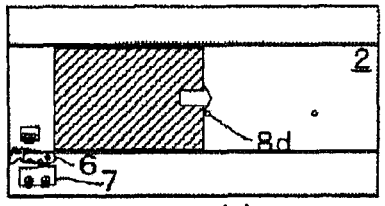

In FIGS. 5 and 6; at first the CPU of the card reader 1 determines whether SW1 (the lever 6) has turned on or not, for judging whether a customer has inserted a card or not (Step S1). When SW1 (the lever 6) turns on from turn-off condition (Step S1: YES. Refer to FIG. 4(a)), the drive rollers 14d to 14f start their rotating operation (Step S2) by using the turn-on condition as a trigger. When the card is drawn further toward the back-end of the card reader to turn on PDa (Step S3: YES), card transfer operation starts and Timer-1 of the CPU of the card reader 1 gets set (Step S4).

Incidentally, when the card transfer operation starts, it becomes possible to calculate the card transfer distance of the inserted card by making use of encoder pulse numbers counted according to the rotation of the drive rollers 14d to 14f. From the viewpoint of the mechanical design, distances from SW1 to PDa, from PDa to PDb, and from PDb to PDc are known.

Then, the CPU of the card reader 1 determines whether PDb has turned on or not (Step S5). In a case where a card has been inserted but PDb does not turn on despite a fact that detecting a magnetic signal out of the magnetic head 10 for the inserted card has started (Step S5: NO and Step S6: YES), it is determined that the card is "a non-standardized transparent card" (a first judgment). Concretely to describe, the CPU sets "flagging for a non-standardized transparent card" in a memory area, such as a RAM (Step S9 in FIG. 6).

Then, if PDb has turned on (Step S5: YES), "flagging for a non-standardized transparent card" is not set, operation progresses to Step S10 in FIG. 6. Meanwhile, if PDb does not turn on and detecting a magnetic signal out of the magnetic head 10 does not start (Step S5: NO and Step S6: NO), it is checked whether Timer-1 set at Step S4 (for example to be 2 seconds) has become 0 or not (Step S7). If Timer-1 has become 0 (Step S7: YES), it is determined that a jam has happened (Step S8) and then the taking-in operation quits.

Incidentally, as a step that follows after the taking-in operation quits through Step 8, there are various possibilities. For example; the card may be forcibly ejected, or may be held inside the card reader 1 until a serviceman comes up, or the card may be sent to a higher-level device internal through the card reader 1.

Next, as FIG. 6 shows, Timer-2 (of the CPU of the card reader 1) is set (Step S10). Then, the CPU determines whether or not PDb has turned off (Step S11). If PDb has turned off (Step S11: YES), "flagging for a non-standardized transparent card" is set in a memory area, such as a RAM (Step S12). The flagging means that there exists a non-standardized transparent card.

Meanwhile, if PDb has turned on (Step S11: NO), the card is not a non-standardized transparent card, and it is handled as a normal card. For the normal card, an algorithm in a conventional way is carried out. Such a process (operation) of the algorithm is widely known, and explanation on it herewith is omitted.

Subsequently, before Timer-2 becomes 0 (Step S14), it is judged whether or not PDc has turned on (Step S13). If PDc has not turned on (Step S13: NO and Step S14: YES), it is determined that there has happened a phenomenon of the card stalled (so-called jamming) around at a middle section of the device (Step S15). Then, the taking-in operation quits. As to a step that follows after the taking-in operation quits, the same explanation as described above is applied.

Meanwhile, if PDc has turned on before Timer-2 becomes 0 (Step S13: YES), a transfer distance is specified (Step S16) and the inserted card is transferred for the specified distance. After the card is transferred for the specified distance (Step S17: YES), it is determined that the transfer of the card has completed, and then the drive motor 11 stops (Step S18) and taking-in the card comes to an end (Step S19).

Incidentally, by using an interval from SW1 switched from on-state to off-state to PDb switched from off-state to on-state as well as a card transfer distance W1 (specifically, it is a rotation of the drive roller 14b) until starting detection of a magnetic signal (an output signal from the magnetic head 10), a card length can be calculated with a formula; the card length 'len'=(a distance from SW1 to PDa (e.g., the photo sensor 8a))+(a distance from S1 to PDb (e.g., the photo sensor 8d))−W1. When a non-standardized transparent card is inserted, PDb turns off. Therefore, by detecting a magnetic signal from the magnetic head 10, the card length can be calculated. On this occasion; if the card length 'Len' is determined to meet a condition of a card with a card length shorter than the distance from PDa to PDb, it is judged that a short card with an insufficient length and then the taking-in operation quits. Furthermore, even in a case of a card that is not determined to be a non-standardized transparent card, a status of PDb is watched continuously. Then, under a condition where a transfer distance W2 after detecting an on-status of PDb for the first time (specifically, it is a rotation of the drive roller 14b) meets a condition of 'W2<Len', detecting an off-status of PDb also results in a determination of 'a non-standardized transparent card' (a second judgment) (Step S12 described above). As described above, it can be assumed that the transparent card in this case is a card including a partially-transparent area.

If "flagging for a non-standardized transparent card" is set in course of Step S9 and Step S12 described above, operation to be described later is carried out. 'A non-standardized transparent card' in this case is defined as a card with which presence of the card can be correctly determined at PDa and PDc, but the sensor PDb, being located in the proximity of the magnetic head 10 for detecting a magnetic signal, cannot correctly determine the presence of the card. For the card, at least it is possible to control the card transfer operation and to read a magnetic signal from the card, and furthermore the card includes magnetic data already written in it. Meanwhile, a normal card, being not a non-standardized transparent card, enables all conventional functions so that the control operation afterward is carried out separately according to the determination.

In the case of 'a non-standardized transparent card', a detection signal from PDb is not reliable so that the detection signal cannot be used for controlling the transfer operation afterward. For example, for transferring a card existing at a back-side location (at the right side in FIG. 1) to a front-side location (at the left side in FIG. 1); the drive rollers 14d to 14f start driving operation and PDb turns on. Subsequently, PDc turns off, and PDa turns on. Afterward, PDa turns off; and then after transferring for a certain distance, the card stops at a stop position of the front-side location (in the front section). Therefore, the sensor PDb requires working normally, even for stopping the card at the stop position of the front-side location.

Therefore, in the processing method of the card reader 1 according to the embodiment; the card starts its transfer operation from the back-side location, and subsequently PDa turns on afterward, and then the stop position of the front-side location is determined according to a transfer distance from timing of PDa switched from off-state to on-state. Also it is necessary to pay attention to a phenomenon of the card stalled (so-called jamming) as an error condition inside the device, for example, around at a middle section of the device. In such a case, the card is involved in the jam around at a middle section of the device. Afterward, when restoration work starts, all the sensors do not recognize the card under the condition and the card seems not to exist in the device so that no further operation can be carried out. Moreover, inconveniently it is still possible for the device under the condition to take in a next card because no card existing is recognized.

Accordingly, in the case of a jam happened under a condition where the card is determined to be a non-standardized transparent card, it becomes necessary to carry out not only retry operation but also driving the rollers in a direction opposite to the driving direction up to the time (namely, for moving the card to a position where the card can be detected by one of the sensors).

However, if controlling by using PDb is indispensably necessary, it must be exclusive controlling, being separated from treatment of a non-standardized transparent card. For example, in the case of a manual card reader that can handle a contact IC-card, moving the card to an IC contact position is required, and the contact position is specified under the current condition with a transfer distance from timing of an end of the card passing through PDb while the card being transferred. However, in the case of a non-standardized transparent card for which PDb does not work normally, such handling cannot be materialized, and therefore a command for such handling must be excluded before it is executed (for example, by returning "in-executable" as an error code). In a similar manner, also in a magnetic data writing operation, a start position for writing magnetic data is specified with a transfer distance from timing of an end of the card passing through PDb while the card being transferred. Therefore, a command for such handling must also be excluded before it is executed. Thus, while some commands must be indispensably excluded, other commands executable in a certain possible extent are operated in a normal way. Incidentally, the determination on a non-standardized transparent card remains to be effective until a next card is inserted.

[Primary Advantageous Effect of the Embodiment]

As described above, by using the card reader 1 and the processing method thereof according to the present embodiment; even in a case where a non-standardized transparent card is inserted, a position of the card inserted in the card path 2 can be detected by means of PDa and PDc shown in FIGS. 3(A)-3(C) as well as the magnetic head 10. Therefore, a certain limited operation such as reproducing magnetic data, for example, can continue as far as possible.

Furthermore, as FIG. 1 shows, the photo sensor 8c that constitutes PDb is located in the proximity of the magnetic head 10. This is because recognizing a correct position of a non-standardized transparent card is needed for writing magnetic data recorded in a magnetic stripe on the card (The further the photo sensor 8c is located away from the magnetic head 10, the more the correction processing for recording magnetic data is needed). In the present embodiment, even when PDb cannot detect the non-standardized transparent card, the magnetic head 10 is used instead. Therefore, only software-wise handling without adding any hardware enables the operation, and accordingly an increase of production costs can be avoided. Furthermore, being different from conventional technologies, the present embodiment does not require any modification at the card side so that collecting the card for modification is not needed, and therefore the present invention provides a device and an operation method thereof that are higher in practicality.

Moreover, the photo sensors 8a and 8b are placed at a side of the card insertion slot 3 with reference to the position of the magnetic head 10, while the photo sensor 8e is placed at a side of the downstream in the transfer direction with reference to the position of the magnetic head 10. Therefore, regardless of whether a non-standardized transparent card is transferred from the front-side of the device or back-side of the same, a position of the non-standardized transparent card can be detected appropriately.

Especially, in the card reader 1 according to the present embodiment, the photo sensors 8a, 8b, and 8e are placed in the same straight line together with the magnetic head 10. In accordance with the arrangement described above, a card position can be detected by making use of a magnetic stripe on a surface of the card. As another idea, for example; it is conceivable to emit an infrared ray of an infrared-ray sensor from a position that is distant from the straight line described above. However, in this case, it may happen that the card position cannot appropriately be detected owing to a reflection of an infrared ray. To avoid such unfavorable conditions in the present embodiment; optical sensors, which are not likely affected by surrounding environments, are placed in the same straight line together with the magnetic head 10 in the card transfer direction. Then, by throwing a light beam emitted from a light emitting element in a vertical direction onto the magnetic stripe, it becomes possible to accurately detect the card position.

In the present embodiment, the magnetic head 10 and a sensor S2 are prepared, being separate from each other. However, these two elements may be integrated as a single unit (a magnetic head equipped with a sensor).

INDUSTRIAL APPLICABILITY

The card reader according to the present invention is useful for its performance to flexibly deal with diversification of customer needs, being able to continue operation to a certain limited extent even when a non-standardized transparent card is inserted.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a transparent card having a magnetic stripe, the transparent card being a plastic card including a transparent part, the card reader comprising:
    a card path through which the transparent card having the magnetic stripe is transferred;
    a magnetic head placed in the card path; and
    a plurality of first card position detecting sensors for detecting a position of the card; and
    a second sensor provided in a vicinity of the magnetic head and deviated from an area of the card path through which the magnetic stripe is passed;
    wherein the plurality of first card position detecting sensors each comprise an optical sensor comprising a light emitting element and a light receiving element, and each of the optical sensors is provided at a position where the magnetic stripe passes through in the card path; and
    wherein each of the optical sensors is configured to detect the transparent card when a light beam emitted from the light emitting element is intercepted by the magnetic stripe;
    wherein at least one of the plurality of first card position detecting sensors is placed at a side of a card insertion slot for inserting the card, with reference to a position of the magnetic head; while at least another one of the plurality of first card position detecting sensors is placed at a downstream side in a card transfer direction, with reference to the position of the magnetic head;
    wherein the plurality of first card position detecting sensors, the second sensor, and the magnetic head are configured such that if the second sensor does not detect the card, a position of the card can be detected by the at least one of the plurality of first card position detecting sensors and the at least another one of the plurality of first card position detecting sensors and the magnetic head.

2. The card reader of claim 1, wherein an additional optical sensor is provided in proximity to the magnetic head; and
    when a magnetic signal from the magnetic head for an inserted card is detected but the additional optical sensor does not detect the card, the card is determined to be a non-standardized transparent card.

3. A processing method of a card reader for use with a card having a magnetic stripe, the method comprising:
    reproducing or recording data to or from the magnetic stripe on the card inserted through a card insertion slot;
    transferring the inserted card through a card path by a transfer means driven by a drive source; and
    detecting a position of the card according to detection signals from a plurality of card position detecting sensors located in the card path, for controlling the transfer operation;
    wherein the plurality of card position detecting sensors include an optical sensor that is placed at a position through which the magnetic stripe passes;
    an additional sensor is placed in proximity to a magnetic head; and
    wherein when a magnetic signal out of the magnetic head for an inserted card is detected but the additional sensor does not detect the card, the card is determined to be a non-standardized transparent card, and then, the non-standardized transparent card is controlled by using a detection signal of the optical sensor that is placed at the position through which the magnetic stripe passes.

* * * * *